United States Patent
Endo et al.

(10) Patent No.: US 10,232,689 B2
(45) Date of Patent: Mar. 19, 2019

(54) VEHICULAR DOOR STRUCTURE

(71) Applicant: HONDA MOTOR CO., LTD., Tokyo (JP)

(72) Inventors: Satoshi Endo, Shioya-gun (JP); Hiromu Inoue, Shioya-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 123 days.

(21) Appl. No.: 15/129,495

(22) PCT Filed: Mar. 27, 2015

(86) PCT No.: PCT/JP2015/059576
§ 371 (c)(1),
(2) Date: Sep. 27, 2016

(87) PCT Pub. No.: WO2015/147250
PCT Pub. Date: Oct. 1, 2015

(65) Prior Publication Data
US 2017/0113521 A1   Apr. 27, 2017

(30) Foreign Application Priority Data
Mar. 28, 2014   (JP) .................. 2014-070274

(51) Int. Cl.
*B60J 5/04* (2006.01)
*B60R 16/02* (2006.01)

(52) U.S. Cl.
CPC .......... *B60J 5/0469* (2013.01); *B60J 5/0413* (2013.01); *B60J 5/0418* (2013.01); *B60J 5/0468* (2013.01); *B60R 16/0215* (2013.01)

(58) Field of Classification Search
CPC ...... B60J 5/0469; B60J 5/0413; B60J 5/0418; B60J 5/0468
(Continued)

(56) References Cited

U.S. PATENT DOCUMENTS 4,957,803 A * 9/1990 Foley .................. B60R 13/0846
156/293
7,913,807 B2 * 3/2011 Gomi .................. B60R 11/0217
181/149

(Continued)

FOREIGN PATENT DOCUMENTS

JP   62-156521 U   10/1987
JP   64-4927 B2   1/1989
(Continued)

OTHER PUBLICATIONS

International Search Report dated Jun. 9, 2015, issued in International Application PCT/JP2015/059576, with English translation (4 pages).

*Primary Examiner* — Marcus Menezes
(74) *Attorney, Agent, or Firm* — Westerman, Hattori, Daniels & Adrian, LLP

(57) ABSTRACT

A vehicular door structure includes a door inner panel in which a work aperture is formed, a sealing sheet configured to close the work aperture, a sealing compound application section formed at the door inner panel, and an attachment member configured to hold a wire-shaped member and attach the wire-shaped member to the door inner panel, wherein the attachment member is disposed in the middle of an extension direction of the sealing compound application section, and a sealing compound configured to adhere the sealing sheet to the door inner panel side is continuously applied across the sealing compound application section and the attachment member.

11 Claims, 10 Drawing Sheets

(58) Field of Classification Search
USPC .......................................................... 49/502
See application file for complete search history.

(56) References Cited

U.S. PATENT DOCUMENTS

| | | | |
|---|---|---|---|
| 9,731,581 B2* | 8/2017 | Fortin | B60J 5/0416 |
| 2005/0150678 A1* | 7/2005 | Takase | B60R 16/0215 |
| | | | 174/72 A |
| 2007/0011949 A1* | 1/2007 | Isobe | B60R 16/0222 |
| | | | 49/475.1 |
| 2008/0128165 A1* | 6/2008 | Bardella | B60R 16/0215 |
| | | | 174/72 A |
| 2017/0018916 A1* | 1/2017 | Itsuki | B60J 10/50 |

FOREIGN PATENT DOCUMENTS

| | | |
|---|---|---|
| JP | 06-144011 A | 5/1994 |
| JP | 7-8102 U | 2/1995 |
| JP | 09-219915 A | 8/1997 |
| JP | 2009-051459 A | 3/2009 |
| JP | 2009-137317 A | 6/2009 |

\* cited by examiner

VEHICULAR DOOR STRUCTURE

TECHNICAL FIELD

The present invention relates to a vehicular door structure.
Priority is claimed on Japanese Patent Application No. 2014-070274, filed Mar. 28, 2014, the contents of which are incorporated herein by reference.

BACKGROUND ART

A space section configured to accommodate built-in parts such as an elevating apparatus for door glass or the like is formed at a vehicular door between a door outer panel and a door inner panel that constitute a door main body. Then, a work aperture configured to allow installation of the built-in parts in the space section from an inside of a passenger compartment is formed in the door inner panel.

The work aperture is closed in a sealed state by a dedicated sealing member after completion of an installation work of the built-in parts (for example, see Patent Documents 1 and 2).

In a vehicular door disclosed in Patent Document 1, a work aperture of a door inner panel is closed by a resin sealing sheet serving as a sealing member from an inside of a passenger compartment. In the case of this vehicular door, a concave-shaped seal bead (a belt-shaped sealing compound application section) is formed at a circumferential edge section of the work aperture of the door inner panel inside the passenger compartment, a sealing compound having adhesiveness is applied to the seal bead after built-in parts are installed in a space section of a door main body section through the work aperture, and the circumferential edge section of the sealing sheet is adhered to the door inner panel via the sealing compound.

In addition, in the vehicular door, a concave section recessed toward an outside of the passenger compartment is formed at the door inner panel to cross a portion of the seal bead, and a rod member (a wire-shaped member) that connects a door inside handle and a door-lock mechanism to the concave section is inserted therethrough. A soft member such as sponge rubber or the like is wound on a portion of the rod member inserted through the concave section of the door inner panel side, and a gap between the concave section and the sealing sheet is buried by the soft member.

Meanwhile, in a vehicular door disclosed in Patent Document 2, a work aperture of a door inner panel is closed by a closing panel having stiffness, and a notch section from which a link (a wire-shaped member) configured to manipulate a door lock is extracted is installed at the closing panel. The notch section is closed by a link cover having stiffness from a back surface side of the closing panel. The link is held at a link cover via a seal member at a gap portion between the link cover and the closing panel.

PRIOR ART DOCUMENTS

Patent Documents

Patent Document 1: Japanese Unexamined Patent Application, First Publication No. S64-4927
Patent Document 2: Japanese Unexamined Patent Application, First Publication No. H06-144011

SUMMARY OF INVENTION

Problems to be Solved by the Invention

Incidentally, in the vehicular door disclosed in Patent Document 1, the sealing, compound applied to the outer circumferential edge section of the work aperture of the door inner panel is discontinuous at the concave section that crosses the seal bead, and a discontinuous portion is buried by the soft member such as sponge rubber or the like wound on the wire-shaped member (the rod member). In this case, the discontinuous portion of the sealing compound is sealed as the soft member of the circumferential region of the wire-shaped member abuts the sealing sheet. However, since the discontinuous portion is buried by the soft member which easily varies its shape, it is difficult to seal a space between the sealing sheet and the seal bead without forming a gap between neighboring seal beads in a state in which the wire-shaped member is accurately positioned.

In addition, in the vehicular door disclosed in Patent Document 2, the work aperture is sealed by the closing panel and the link cover, which are formed of a hard material, and the wire-shaped member is inserted between the closing panel and the link cover via the seal member. For this reason, the number of seal places is increased, and thus, the structure may be complicated.

Here, an aspect of the present invention is directed to provide a vehicular door structure capable of easily closing a work aperture while sealing a circumferential region of a withdrawal portion of a wire-shaped member using a simple structure.

Means for Solving the Problems

In order to achieve the aforementioned objects, a vehicular door structure according to the present invention employs the following configurations.

(1) A vehicle body structure according to an aspect of the present invention includes a door inner panel in which a work aperture is formed; a sealing sheet configured to close the work aperture from an inside of a passenger compartment of the door inner panel; a belt-shaped sealing compound application section formed at an inner side surface of the passenger compartment of the door inner panel and configured to surround a circumferential region of the work aperture; and an attachment member configured to hold a wire-shaped member withdrawn from an outside of the passenger compartment of the door inner panel toward the inside of the passenger compartment through the work aperture and attach the wire-shaped member to the door inner panel, wherein the attachment member is disposed in the middle of an extension direction of the sealing compound application section, and a sealing compound configured to tightly adhere an outer circumferential edge section of the sealing sheet to the door inner panel side is continuously applied across the sealing compound application section and the attachment member.

Accordingly, the wire-shaped member is attached to the door inner panel via the attachment member, and the sealing compound is continuously applied across the sealing compound application section that surrounds the work aperture on the door inner panel and the attachment member disposed at a withdrawal portion of the wire-shaped member in the middle of the sealing compound application section. The sealing sheet configured to close the work aperture of the door inner panel has a circumferential edge section continuously adhered to the door inner panel side via the sealing compound applied to the sealing compound application section and the attachment member.

(2) In an aspect of the above-mentioned (1), the door inner panel may include a first surface including the sealing compound application section and a second surface recessed toward the outside of the passenger compartment with respect to the first surface, the attachment member may include an attachment section attached to the second surface of the door inner panel, and a seal section to which the sealing compound is applied, and the first surface and the seal section may have edge sections adjacent to each other, heights of which are set to substantially the same height.

In this case, since there is no step difference between the first surface of the door inner panel and the attachment member, interruption of the sealing compound when the sealing compound is applied to an inner surface and the attachment member can be suppressed.

(3) In the aspect of the above-mentioned (2), the first surface and the seal section may be flush with each other.

In this case, since surfaces to which the sealing sheet is adhered are flush with each other, bending cannot be easily generated in the sealing sheet. As a result, seal performance of a circumferential edge of the work aperture by the sealing sheet is improved.

(4) In the aspect of the above-mentioned (2) or (3), the attachment member may include an insertion section through which the wire-shaped member is inserted between the attachment section and the seal section.

In this case, since the wire-shaped member is held at the insertion section between the attachment section and the seal section, the wire-shaped member can be held at the attachment member with no increase in size of the attachment member. In addition, since an undesirable movement of the wire-shaped member during attachment of the attachment member or adhesion of the sealing sheet to the door inner panel can be suppressed, workability upon manufacture can be improved.

(5) In an aspect of the above-mentioned (4), an inner diameter of the insertion section may be smaller than an outer diameter of the wire-shaped member.

In this case, when the wire-shaped member is inserted into the insertion section, the wire-shaped member is tightly adhered to the insertion section.

Accordingly, acoustic insulation is improved while temporarily holding the wire-shaped member.

(6) In an aspect of the above-mentioned (4) or (5), the attachment section and the seal section may be assembled to be opened and closed.

In this case, the wire-shaped member can be fixed by sandwiching the wire-shaped member between the attachment section of the attachment member and the seal section. For this reason, workability when the wire-shaped member is fixed to the attachment member is improved.

(7) In an aspect of the above-mentioned (6), the attachment section may include a protruding wall protruding toward the seal section side and having a groove that forms the insertion section between the seal section and the attachment section, and the seal section may include an engagement section engaged with the protruding wall when the seal section is closed with respect to the attachment section.

In this case, the wire-shaped member can be easily held at the attachment section side by only inserting the wire-shaped member into the groove formed in the protruding wall of the attachment section. In addition, the attachment section and the seal section can be easily fixed by only engaging the engagement section of the seal section side with the protruding wall of the attachment section side. For this reason, the structure of the attachment member can be simplified in comparison with the case in which a dedicated fixing section is formed at the attachment section side. Further, in the case of the above-mentioned configuration, since the attachment section and the seal section can be fixed simultaneously with an operation of sandwiching the wire-shaped member between the attachment section and the seal section, workability during assembly is improved.

(8) In an aspect of the above-mentioned (7), the seal section may include a shielding wall protruding in a direction substantially perpendicular to an extension direction of the groove of the protruding wall and configured to cover one side of the attachment section, and the engagement section may be connected to the shielding wall.

In this case, since the one side of the attachment section is covered by the shielding wall, intrusion of sound or water from the one side of the attachment member can be reduced by the shielding wall. In addition, since the shielding wall and the engagement section are connected, a collapse of the shielding wall can be suppressed by the engagement section, and thus, acoustic insulation can be improved and intrusion of water can be reduced.

(9) In an aspect of the above-mentioned (8), the groove of the protruding wall may be open at the seal section side in a substantially C shape, and the seal section may include a rib protruding toward an inside of the groove of the protruding wall.

In this case, since the groove of the protruding wall has a substantially C shape, the wire-shaped member can be easily inserted into the groove. In addition, when the attachment section and the seal section are closed, since the rib protrudes inward in the groove of the protruding wall, movement of the wire-shaped member from the groove of the protruding wall during attachment of the wire-shaped member can be suppressed by the rib.

Advantageous Effects of Invention

According to the aspect of the present invention, the sealing compound configured to attach the sealing sheet to a periphery of the work aperture is continuously applied throughout the belt-shaped sealing compound application section formed at the door inner panel and to the attachment member extracted from the work aperture to hold the wire-shaped member. For this reason, the work aperture can be easily closed by the sealing sheet while sealing the circumferential region of the withdrawal portion of the wire-shaped member with a simple structure.

In addition, according to the aspect of the present invention, the sealing compound can be applied to the attachment member that holds the wire-shaped member. For this reason, the number of parts can be reduced in comparison with the case in which parts dedicated for applying the sealing compound are added, and further, movement of the wire-shaped member during application of the sealing compound can be restricted by the attachment member. Accordingly, deterioration of sealability due to interruption of the sealing compound can be prevented.

In particular, according to the aspect of the present invention, the outer circumferential edge section of the sealing sheet can be attached to the door inner panel side without interruption. For this reason, acoustic insulation or a waterproof property can be further increased.

Further, according to the aspect of the present invention, the sealing compound can be continuously applied at once to the sealing compound application section and the attachment member of the door inner panel to which the sealing sheet is attached. For this reason, in addition to a simplification of the structure, attachment workability of the sealing sheet is improved.

DESCRIPTION OF EMBODIMENTS

Hereinafter, an embodiment of the present invention will be described with reference to the accompanying drawings.

Figure 1:
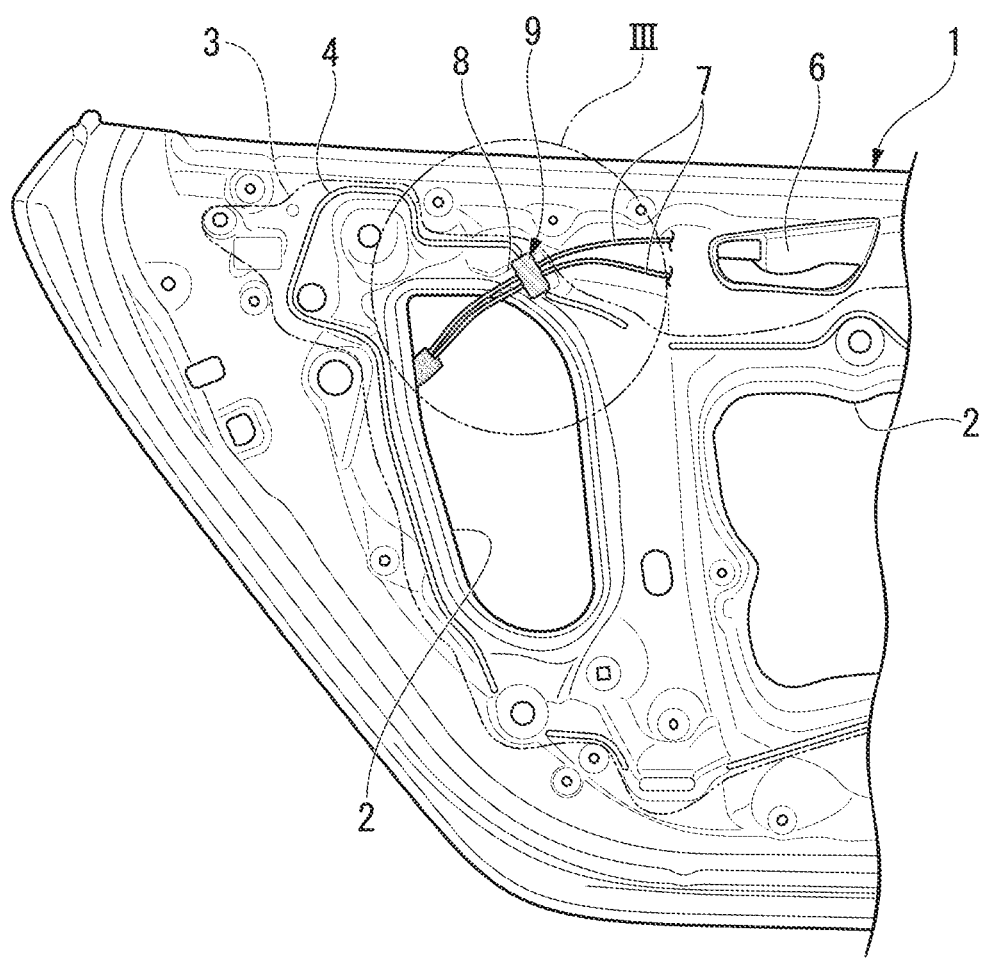
FIG. 1 is a front view showing a vehicular door of an embodiment of the present invention when seen from an inside of a passenger compartment.

FIG. 1 is a front view showing a portion of a vehicular door according to the embodiment when seen from the inside of a passenger compartment.

A door main body section of a vehicular door to which a door inner panel 1 is attached is provided inside a door outer panel (not shown). A door sash (not shown) is installed at an upper portion of the door main body section, and door glass (not shown) is supported by the door sash to be freely elevated. A space section configured to accommodate built-in parts (not shown) such as an elevating apparatus or the like for the door glass is installed at the door main body section. A plurality of work apertures 2 configured to assemble the built-in parts into the door main body section is formed at the door inner panel 1. The work aperture 2 is closed by a sealing sheet 3 (see FIG. 2) formed of a resin from the inside of the passenger compartment after the built-in parts are assembled into the door main body section. Further, a vehicle interior part such as door trim or the like is attached to the inside of the passenger compartment of the door inner panel 1 after the work aperture 2 is closed by the sealing sheet 3.

Figure 2:
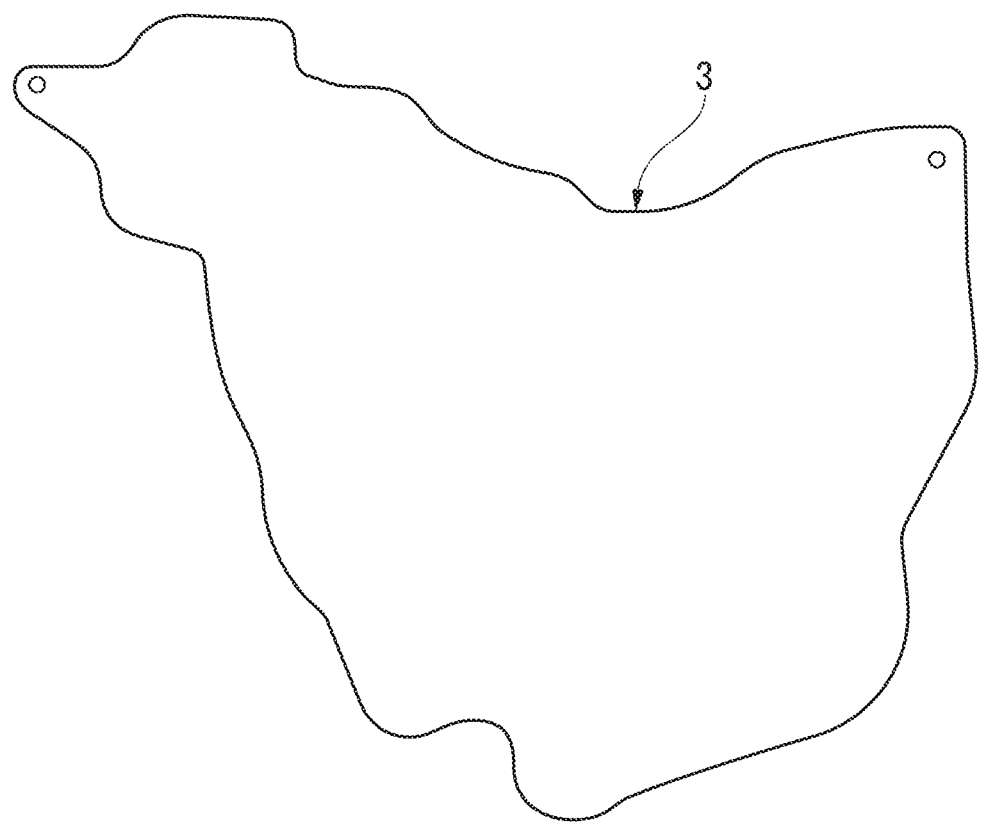
FIG. 2 is a front view of a sealing sheet of the embodiment of the present invention.
Figure 3:
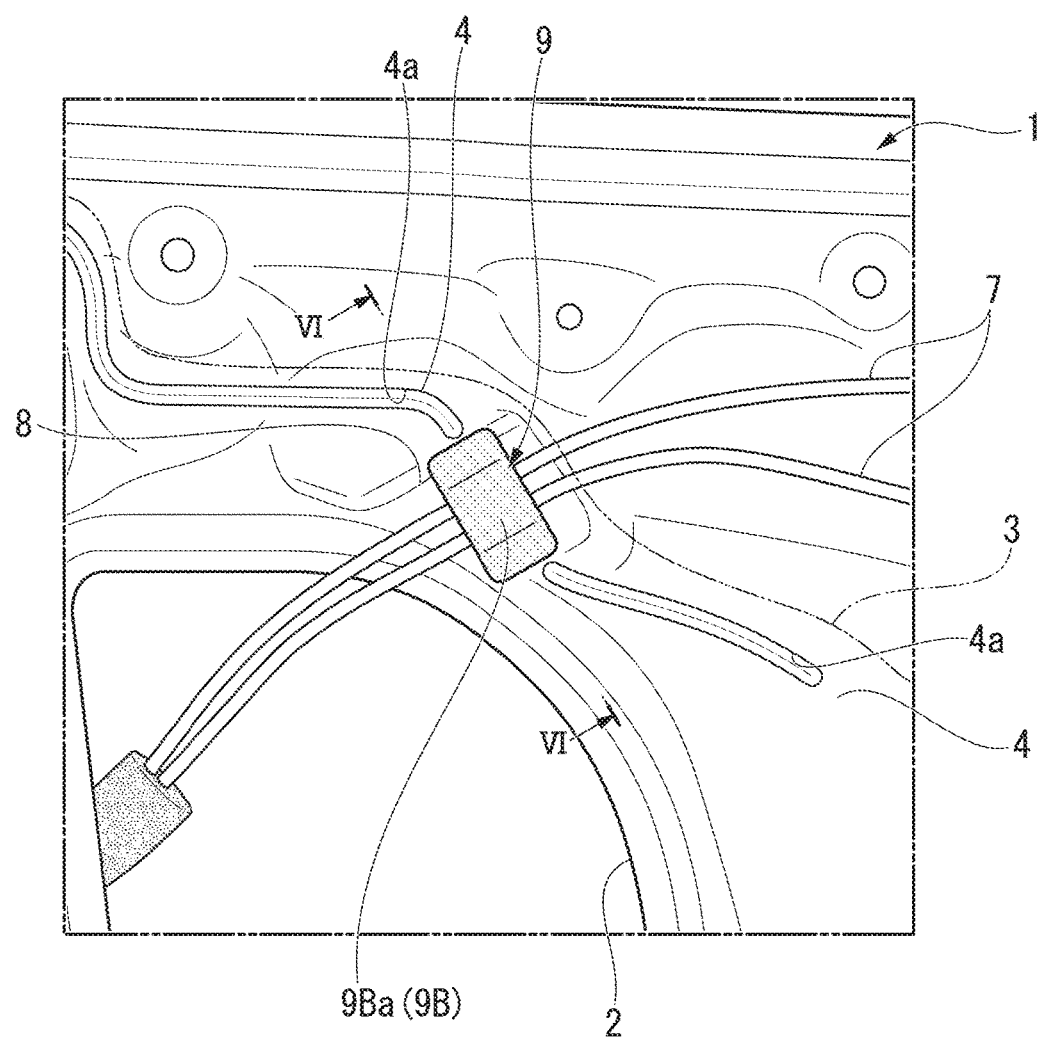
FIG. 3 is an enlarged front view showing a portion III of FIG. 1 of the vehicular door of the embodiment of the present invention.
Figure 4:
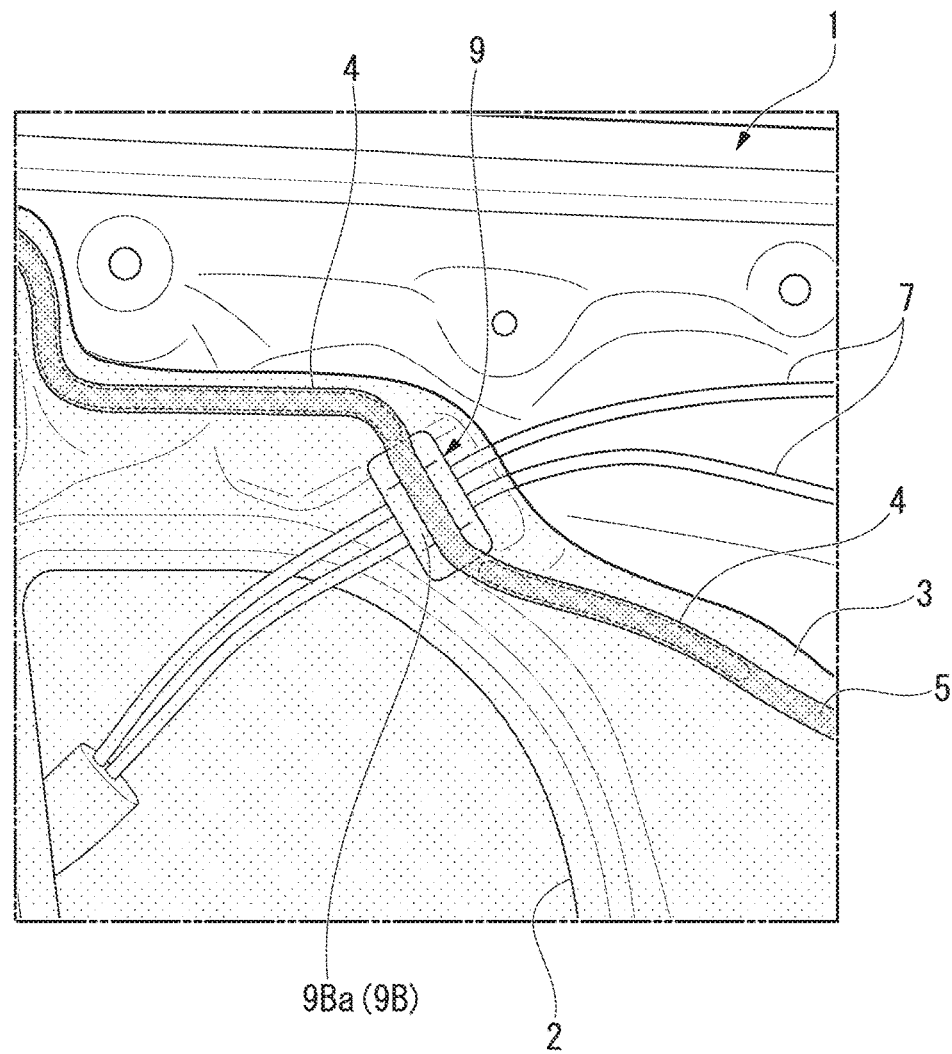
FIG. 4 is the same front view as FIG. 3 in a state in which the sealing sheet of the vehicular door of the embodiment of the present invention is attached.

FIG. 2 is a view showing the sealing sheet 3. FIG. 3 is an enlarged view of a portion III of FIG. 1. In addition, FIG. 4 is the same view as FIG. 3 showing a state in which the work aperture 2 is closed by the sealing sheet 3.

A belt-shaped sealing compound application section 4 is formed at the door inner panel 1 to surround an outside of a region across the plurality of work apertures 2. In the case of the embodiment, the sealing compound application section 4 is formed by the belt-shaped continuous surface, and a seal bead 4a recessed toward an outside of the passenger compartment in a concave shape is formed at an appropriate place of a continuous surface at a center in a belt-width direction. A sealing compound 5 (see FIG. 4) configured to tightly attach an outer circumferential edge section of the sealing sheet 3 to the door inner panel 1 is applied to the sealing compound application section 4. A material having adhesiveness capable of holding airtightness between the material and the sealing sheet 3, the door inner panel 1, or the like, for a long time is used as the sealing compound 5. The seal bead 4a is formed in the sealing compound application section 4 to stably accommodate the sealing compound 5. Further, the seal bead 4a may not be formed in the sealing compound application section 4. In addition, in the embodiment, a surface of the sealing compound application section 4 constitutes a first surface of the door inner panel 1.

A pair of wire cables 7 (wire-shaped members) configured to interlock a door inside handle 6 inside the passenger compartment and a door lock mechanism (not shown) in the door main body section is disposed in the vicinity of an upper side portion of the door inner panel 1. The wire cables 7 are disposed to cross an upper side portion of the sealing compound application section 4 from the door inside handle 6 side toward the door lock mechanism in a downwardly inclined direction. The wire cables 7 are connected to the door lock mechanism in the door main body section through the work aperture 2 after crossing the upper side portion of the sealing compound application section 4 in the downwardly inclined direction.

Figure 5:
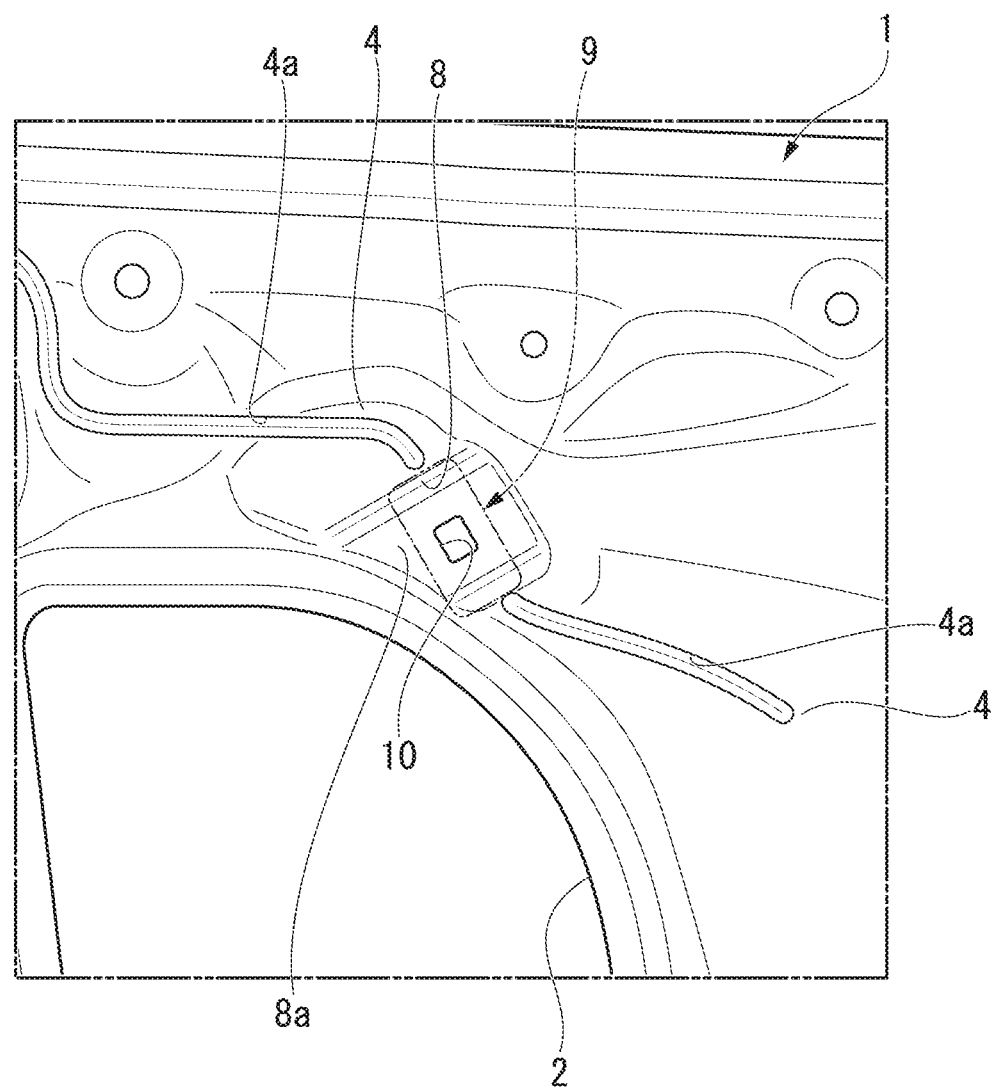
FIG. 5 is the same front view as FIG. 3 in a state in which an attachment member of the vehicular door of the embodiment of the present invention is removed.

FIG. 5 is the same view as FIG. 3 showing a state in which the wire cables 7 are removed.

As shown in FIG. 5, the sealing compound application section 4 of the door inner panel 1 is configured such that a portion below which the wire cables 7 cross is divided by a concave-shaped portion 8 recessed toward the outside of the passenger compartment and the wire cables 7 are disposed in the concave-shaped portion 8. A resin block 9 serving as an attachment member having a contour that substantially buries the concave-shaped portion 8 is attached to the concave-shaped portion 8. The resin block 9 is attached into the concave-shaped portion 8 while holding the wire cables 7, and the sealing compound 5 is applied to an upper surface of the resin block 9 and continued to the sealing compound application section 4. Further, in FIG. 5, reference numeral 10 is a locking hole formed in a bottom surface 8a of the concave-shaped portion 8 to lock and fix the resin block 9.

The resin block 9 includes an attachment section 9A attached to the concave-shaped portion 8 of the door inner panel 1, and a seal section 9B to which the sealing compound 5 is applied at the upper surface side. A locking hook section 13 inserted into the locking hole 10 of the door inner panel 1 side to be locked and fixed thereto protrudes from a back surface of the attachment section 9A. Further, in the embodiment, the bottom surface 8a of the concave-shaped portion 8 constitutes a second surface recessed toward the outside of the passenger compartment with respect to the first surface.

Here, the upper surface of the seal section 9B to which the sealing compound 5 is directly applied is referred to as a seal surface 9Ba. The seal surface 9Ba of the resin block 9 has a central region that is flat, and both edge sections continue to the central region are gently curved toward the sealing compound application section 4 of the door inner panel 1 to decrease a height thereof. Then, the sealing compound application section 4 of the door inner panel 1 and the seal surface 9Ba of the resin block 9 attached to the concave-shaped portion 8 have edge sections that are adjacent to each other and have substantially the same height. That is, the seal surface 9Ba of the resin block 9 and the sealing compound application section 4 are continuous with each other with substantially no step difference.

Further, in the case of the embodiment, while the seal surface 9Ba of the seal section 9B is a smooth surface, an embossing processing may be performed on the seal surface 9Ba to cut fine grooves to form a rough surface thereon, and the same groove as the seal bead 4a may be formed. In this case, a drooping of the sealing compound from the seal surface 9Ba can be effectively prevented.

The built-in parts are installed in the door main body section through the work aperture 2, the resin block 9 holding the wire cables 7 is attached to the concave-shaped portion 8, and then the work aperture 2 of the door inner panel 1 is closed by the sealing sheet 3. Here, the sealing compound 5 is simultaneously and continuously applied to the sealing compound application section 4 of the door inner panel 1 and the seal surface 9Ba of the resin block 9. Then, the outer circumferential edge section of the sealing sheet 3 is covered at the sealing compound application section 4 and the resin block 9 to which the sealing compound 5 is applied in this way, and the sealing sheet 3 is attached to the door inner panel 1 in a state in which the work aperture 2 is substantially sealed.

Figure 6:
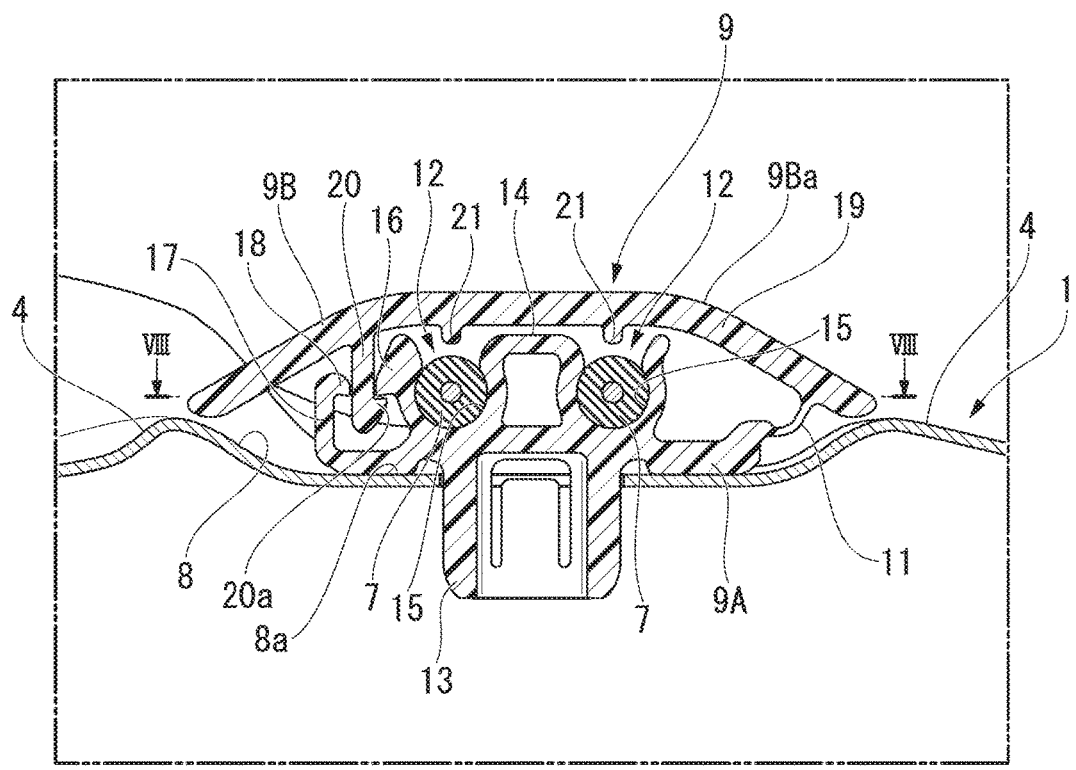
FIG. 6 is a cross-sectional view corresponding to a cross section of the vehicular door of the embodiment of the present invention taken along line VI-VI of FIG. 3.
Figure 7:
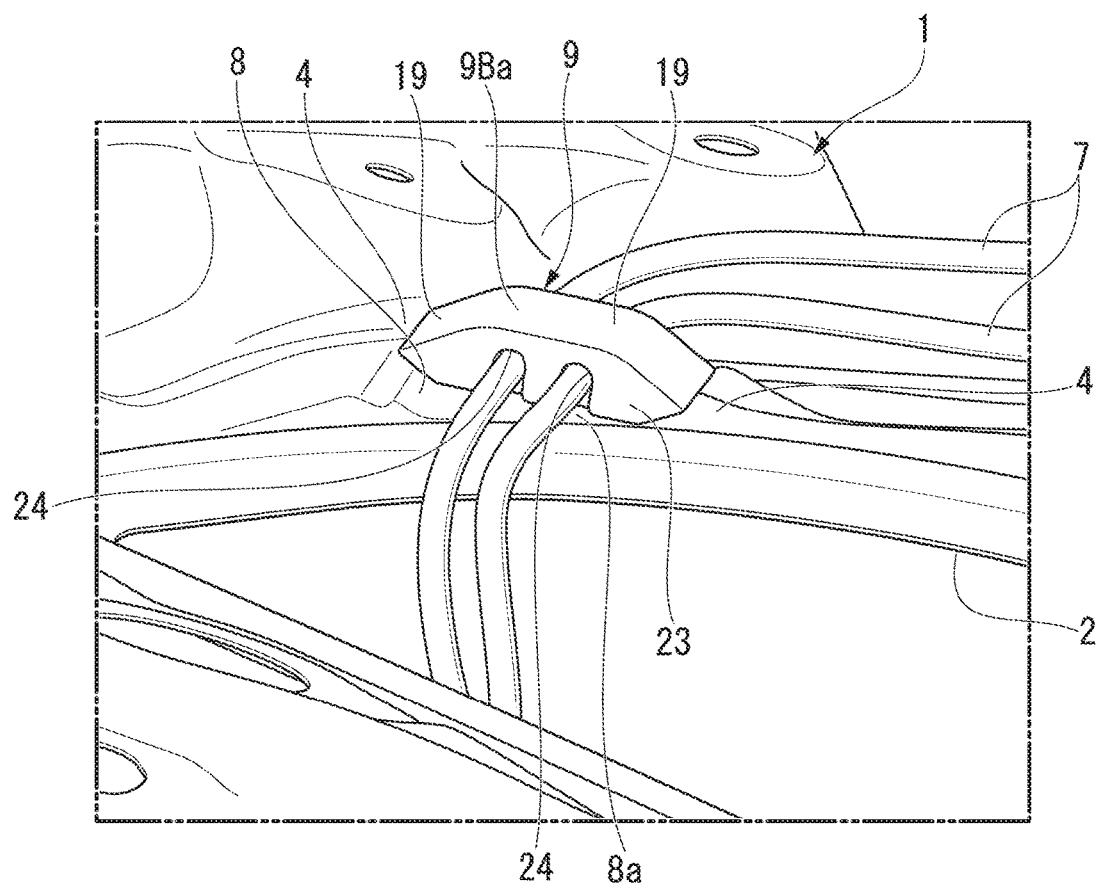
FIG. 7 is a perspective view focused on the attachment member of the vehicular door of the embodiment of the present invention.
Figure 8:
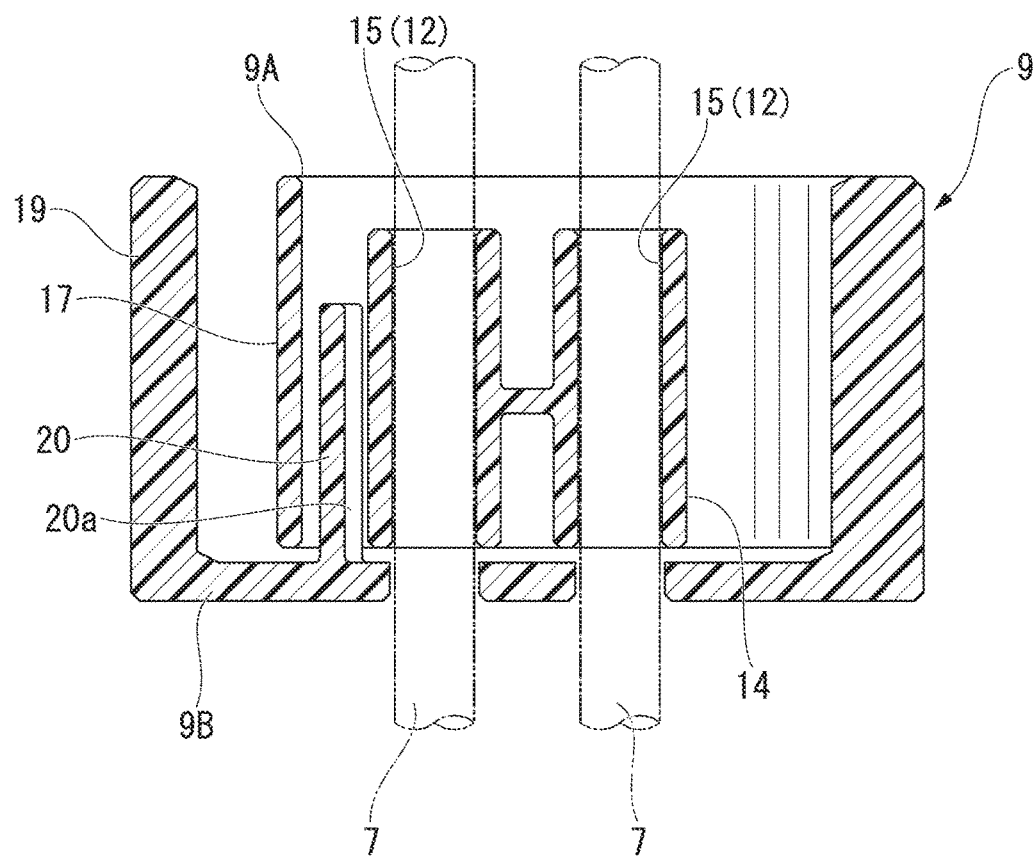
FIG. 8 is a cross-sectional view corresponding to a cross section of the vehicular door of the embodiment of the present invention taken along line VIII-VIII of FIG. 6.
Figure 9:
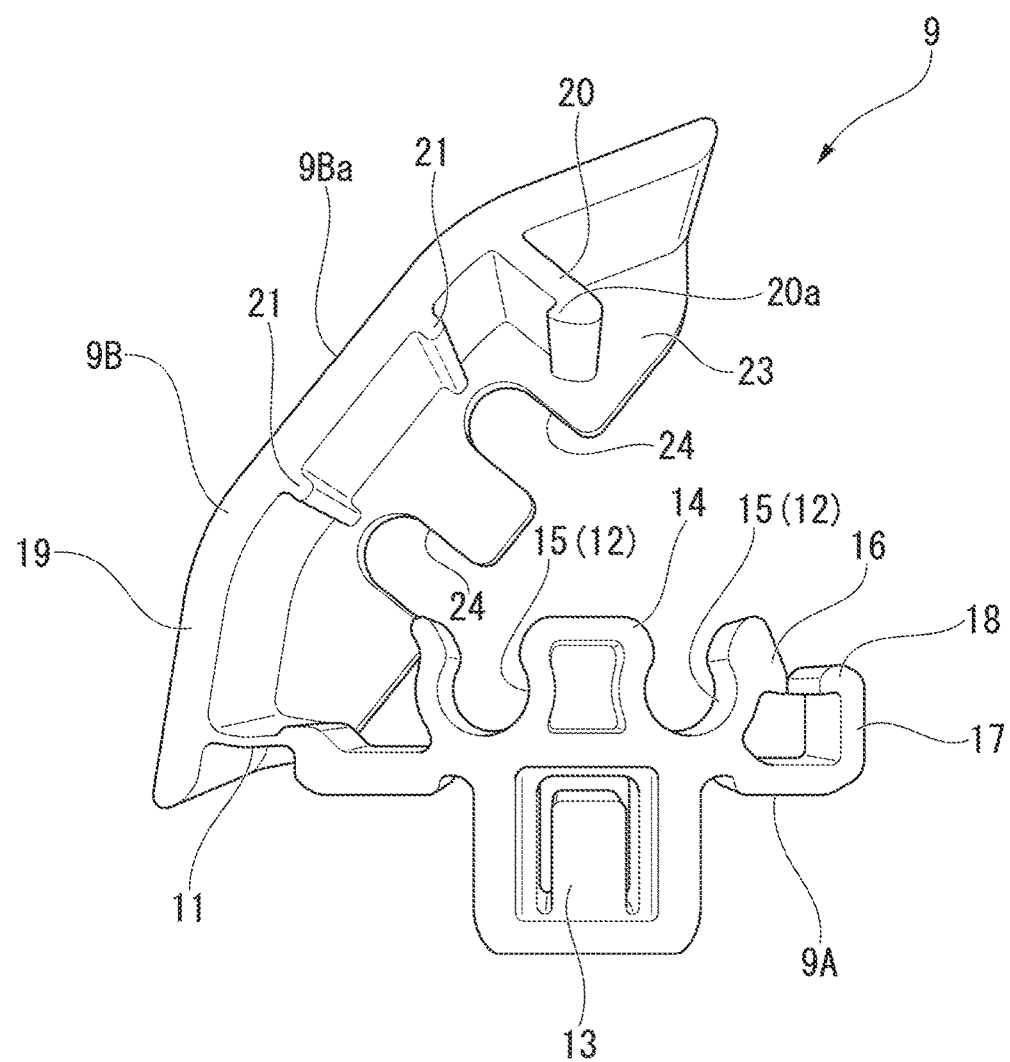
FIG. 9 is a perspective view of the attachment member of the embodiment of the present invention.
Figure 10:
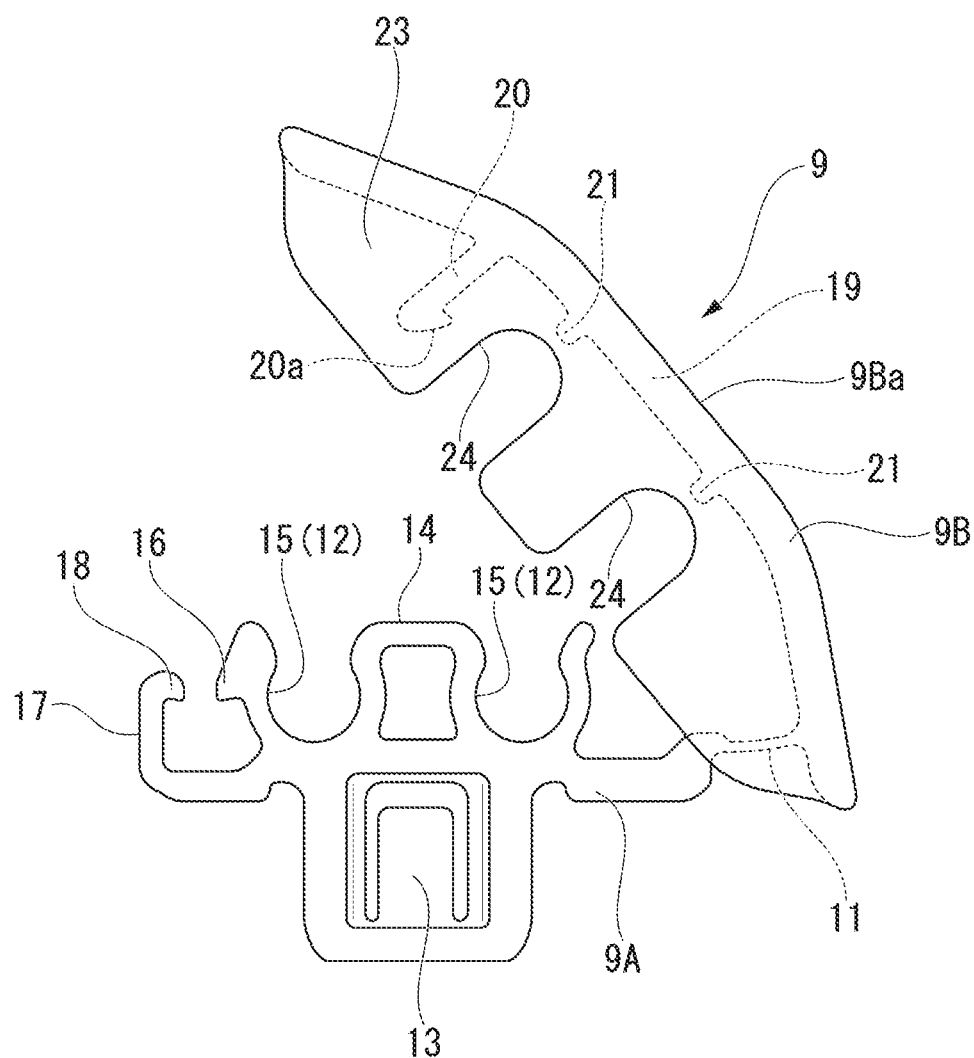
FIG. 10 is a side view of the attachment member of the embodiment of the present invention.

FIG. 6 is a cross-sectional view of the vehicular door focused on the resin block 9 corresponding to a cross section taken along line VI-VI of FIG. 3. FIG. 7 is a perspective view of the vehicular door focused on the resin block 9. In addition, FIGS. 8 to 10 are views showing a single resin block 9.

As shown in FIGS. 6 to 10, the resin block 9 is configured such that the attachment section 9A and the seal section 9B can be opened and closed with an integral hinge 11 sandwiched therebetween, and insertion sections 12 through which the pair of wire cables 7 are inserted are formed between the attachment section 9A and the seal section 9B. The integral hinge 11 is formed at one end portion in a direction substantially perpendicular to a direction in which the wire cables 7 on the resin block 9 are inserted. Accordingly, the attachment section 9A and the seal section 9B can be opened and closed in a direction substantially perpendicular to the direction in which the wire cables 7 are inserted.

Hereinafter, in the resin block 9, the direction in which the wire cables 7 are inserted is referred to as an axial direction, and a direction substantially perpendicular to the direction in which the wire cables 7 are inserted and coinciding with a transverse direction of the concave-shaped portion 8 is referred to as a longitudinal direction.

Both of the attachment section 9A and the seal section 9B are formed in a substantially rectangular shape when seen in a plan view, and the shape of the seal section 9B when seen in a plan view is slightly larger than a shape of the attachment section 9A when seen in a plan view.

The above-mentioned locking hook section 13 protrudes from the back surface side of the attachment section 9A, and a block-shaped protruding wall 14 protruding toward the back surface of the closed seal section 9B protrudes from a front surface side. A pair of substantially C-shaped grooves 15 separated from each other in the longitudinal direction are formed in the protruding wall 14. The substantially C-shaped grooves 15 are formed in the axial direction to a predetermined length, and open toward a back surface of the closed seal section 9B.

The grooves 15 of the protruding wall 14 constitute the insertion sections 12 through which the wire cables 7 are inserted together with the back surface of the seal section 9B when the seal section 9B is closed. An inner diameter of the substantially C-shaped grooves 15 of the protruding wall 14 is set to be smaller than an outer diameter of the wire cables 7.

In addition, a locking block 16 outwardly overhanging in the transverse direction is installed at a side end portion of the protruding wall 14 separated from the integral hinge 11 in the longitudinal direction (a portion that forms a sidewall of one of the grooves 15). Then, a sidewall 17 erected toward the back surface side of the closed seal section 9B extends from the side end portion of the attachment section 9A separated from the integral hinge 11, and a bent wall 18 facing the locking block 16 with a set gap is formed at an extended end of the sidewall 17.

In the seal section 9B, an engagement wall 20 extending toward the attachment section 9A extends from a back surface of an upper wall 19 that covers an upper side of the attachment section 9A. A hook section 20a is formed at a distal end portion of the engagement wall 20, and the hook section 20a is engaged with the locking block 16 of the protruding wall 14 when the seal section 9B is closed. Further, in the embodiment, the engagement wall 20 including the hook section 20a constitutes an engagement section of the seal section 9B engaged with the protruding wall 14 side.

In addition, a pair of ribs 21 protruding toward an inside of the grooves 15 of the attachment section 9A side protrudes from the back surface of the upper wall 19 of the seal section 9B. The ribs 21 extend in the longitudinal direction at the back surface side of the seal section 9B, face the wire cables 7 held at the grooves 15 when the seal section 9B is closed, and thereby deviation of the wire cables 7 in a coming-out direction is restricted.

A shielding wall 23 protruding in a direction substantially perpendicular to an extension direction (an axial direction) of the grooves 15 of the attachment section 9A side and configured to cover an end portion of the attachment section 9A is formed at one end portion in the axial direction of the upper wall 19 of the seal section 9B. A pair of U-shaped cutout grooves 24 configured to allow the wire cables 7 held in the grooves 15 of the attachment section 9A to be withdrawn are formed at the shielding wall 23.

In addition, the engagement wall 20 protruding at the back surface of the upper wall 19 and end portions of the ribs 21 are integrally connected to the shielding wall 23. Accordingly, the engagement wall 20 and the ribs 21 also function as reinforcement walls configured to restrict a collapse of the shielding wall 23.

Further, the shielding wall 23 is installed at an end portion in the axial direction of the upper wall 19 of the seal section 9B adjacent to an opening edge of the work aperture 2. For this reason, when sound, water droplets, or the like intrude into the resin block 9 through the work aperture 2, the intrusion can be efficiently obstructed by the shielding wall 23.

As described above, in the vehicular door according to the embodiment, the wire cables 7 serving as the wire-shaped members are held at the resin block 9, the resin block 9 is attached to the concave-shaped portion 8 serving as the discontinuous section of the sealing compound application section 4 of the door inner panel 1, and in this state, the sealing compound 5 is continuously applied to the sealing compound application section 4 and the seal surface 9Ba of the resin block 9. For this reason, as the outer circumferential edge section of the sealing sheet 3 is attached to be covered on the applied sealing compound 5, the work aperture 2 can be easily closed by the sealing sheet 3 while sealing circumferential regions of withdrawal portions of the wire cables 7.

In addition, in the embodiment, the sealing compound can be applied to the resin block 9 in a state in which the wire cables 7 are held. For this reason, in comparison with the case in which dedicated parts configured to apply the sealing compound are added, the number of parts can be reduced.

Further, upon application of the sealing compound, movement of the wire cables 7 can be restricted by the resin block 9. For this reason, interruption of the sealing compound due to an undesirable movement of the wire cables 7 upon working can be prevented. Accordingly, deterioration of seal performance caused by the interruption can be prevented.

In particular, in the vehicular door according to the embodiment, the sealing compound 5 can be continuously applied at once to the sealing compound application section 4 to which the sealing sheet 3 is attached and the resin block 9. For this reason, a structure of the seal section can be simplified, and further, attachment workability of the sealing sheet 3 can be improved.

In addition, in the case of the vehicular door of the embodiment, the outer circumferential edge section of the sealing sheet 3 can be attached to the door inner panel 1 side without interruption. For this reason, acoustic insulation or waterproof performance can be further increased.

In addition, in the vehicular door according to the embodiment, the door inner panel 1 includes the sealing compound application section 4 (the first surface), and the bottom surface 8a (the second surface) of the concave-shaped portion 8 recessed toward the outside of the passenger compartment with respect to the surface of the sealing, compound application section 4, and in a state in which the resin block 9 is attached to the concave-shaped portion 8, the surface of the sealing compound application section 4 and the edge section of the seal surface 9Ba of the resin block 9 adjacent thereto have substantially the same height. Accordingly, the sealing compound application section 4 and the seal surface 9Ba of the resin block 9 can be continuously configured with no step difference. For this reason, interruption of the sealing compound 5 when the sealing compound 5 is applied to the sealing compound application section 4 and the seal surface 9Ba of the resin block 9 can be suppressed.

Further, in the above-mentioned embodiment, while the central region in the longitudinal direction of the upper wall 19 of the resin block 9 is upwardly raised, the seal surface 9Ba of the resin block 9 may be flat to be flush with the sealing compound application section 4. In this case, the surfaces to which the sealing sheet 3 is attached are flush with each other, bending cannot easily occur in the sealing sheet 3, and seal performance of the circumferential edge of the work aperture 2 by the sealing sheet 3 is further improved.

In addition, in the case of the vehicular door according to the embodiment, the insertion sections 12 through which the wire cables 7 are inserted are formed between the attachment section 9A and the seal section 9B of the resin block 9 attached to the concave-shaped portion 8 on the door inner panel 1. For this reason, the wire cables 7 can be held at the resin block 9 without an increase in size of the resin block 9.

Further, in this case, when the wire cables 7 are previously inserted through the insertion sections 12, the wire cables 7 can be suppressed from being irregularly directed during the attachment of the resin block 9 or the adhesion of the sealing sheet 3 to the door inner panel 1, and workability during manufacture can be improved.

Further, in the embodiment, an inner diameter of the insertion sections 12 formed at the resin block 9 (the inner diameter of the substantially C-shaped grooves 15) is set to be larger than the outer diameter of the wire cables 7. For this reason, as the wire cables 7 are fitted into the insertion sections 12, outer circumferential surfaces of the wire cables 7 are tightly adhered to inner surfaces of the insertion sections 12. For this reason, the wire cables 7 can be temporarily held during working as the wire cables 7 are fitted into the insertion sections 12, and intrusion of sound or water through the gap between the circumferential regions of the wire cables 7 can be efficiently obstructed.

In addition, in the case of the vehicular door of the embodiment, the attachment section 9A and the seal section 9B of the resin block 9 can be opened and closed via the integral hinge 11. For this reason, as the attachment section 9A and the seal section 9B are closed, the wire cables 7 can be sandwiched by the attachment section 9A and the seal section 9B to be simply fixed. Accordingly, as the structure is employed, workability when the wire cables 7 are fixed to the resin block 9 is improved.

Further, in the embodiment, the attachment section 9A and the seal section 9B of the resin block 9 are connected such that it is capable of being opened and closed via the integral hinge 11. However, the attachment section 9A and the seal section 9B may be formed as separate members to be attached to or detached from each other as long as the attachment section 9A and the seal section 9B have a structure that can be opened and closed.

In addition, in the case of the embodiment, the protruding wall 14 protruding toward the seal section 9B side is formed at the attachment section 9A of the resin block 9, and the grooves 15 forming the insertion sections 12 of the wire cables 7 are formed in the protruding wall 14 between the seal section 9B and the attachment section 9A. Meanwhile, the engagement wall 20 engaged with the locking block 16 of the protruding wall 14 is formed at the seal section 9B when the seal section 9B is closed with respect to the attachment section 9A. For this reason, the wire cables 7 can be easily held at the resin block 9 by inserting the wire cables 7 into the grooves 15 of the attachment section 9A in a state in which the attachment section 9A and the seal section 9B are opened, and further, when the seal section 9B is closed with respect to the attachment section 9A, the attachment section 9A and the seal section 9B can be easily fixed by only engaging the hook section 20a of the engagement wall 20 with the locking block 16 of the attachment section 9A side. Then, when the structure of the resin block 9 is employed, the attachment section 9A and the seal section 9B can be fixed simultaneously with an operation of sandwiching the wire cables 7 between the attachment section 9A and the seal section 9B, and the workability during the manufacturing is improved.

Further, in the embodiment, the shielding wall 23 protruding in the direction substantially perpendicular to the axial direction and configured to cover one side of the attachment section 9A is formed at the one end in the axial direction of the seal section 9B of the resin block 9, and the end portion of the engagement wall 20 engaged with the locking block 16 when the seal section 9B is closed is connected to the shielding wall 23. For this reason, sound or water droplets intruding into the resin block 9 through the work aperture 2 can be efficiently blocked by the shielding wall 23, and a collapse of the shielding wall 23 can be suppressed by the engagement wall 20.

In addition, in the case of the embodiment, ribs extending in the axial direction at the back surface side of the seal section 9B are also connected to the shielding wall 23. For this reason, a collapse of the shielding wall 23 can be more reliably suppressed. Accordingly, an intrusion of water droplets due to a collapse of the shielding wall 23 can be prevented.

Further, in the embodiment, while the shielding wall 23 configured to cover one side of the attachment section 9A protrudes at one end of the seal section 9B, the shielding wall may be integrally formed at the attachment section 9A side.

Further, in the case of the embodiment, the substantially C-shaped grooves 15 open at the seal section 9B side are formed at the protruding wall 14 of the resin block 9, and the ribs 21 protruding toward the inside of the grooves 15 of the protruding wall 14 are formed at the back surface of the seal section 9B. For this reason, the wire cables 7 can be easily inserted into the grooves 15, and further, when or after the seal section 9B is closed, movement of the wire cables 7 in a direction leaving the grooves 15 can be reliably restricted by the ribs 21.

Further, the present invention is not limited to the above-mentioned embodiment, various design changes may be made without departing from the scope of the present invention. For example, in the above-mentioned embodiment, while the wire cables 7 configured to interlock the door inside handle 6 and the lock mechanism have been described as the wire-shaped members, the wire-shaped members are not limited to the wire cables 7 but may be rods, wires, harnesses, or the like for another use as long as the members are wire-shaped members withdrawn from the work aperture 2 to cross the sealing compound application section 4.

In addition, in the above-mentioned embodiment, while the resin block 9 is used as the attachment member configured to hold the wire-shaped member and attach the wire-shaped member to the door inner panel, a material of the attachment member is not limited to the resin but may be a metal or another material.

REFERENCE SIGNS LIST

1 Door inner panel
2 Work aperture
3 Sealing sheet
4 Sealing compound application section
5 Sealing compound
7 Wire cable (wire-shaped member)
8a Bottom surface (second surface)
9 Resin block (attachment member)
9A Attachment section
9B Application section
12 Insertion section
14 Protruding wall
20 Engagement wall (engagement section)
21 Rib
23 Shielding wall

The invention claimed is:

1. A vehicular door structure comprising:
a door inner panel in which a work aperture is formed;
a sealing sheet configured to close the work aperture from an inside of a passenger compartment of the door inner panel;
a belt-shaped sealing compound application section formed at an inner side surface of the passenger compartment of the door inner panel and configured to surround a circumferential region of the work aperture; and
an attachment member configured to removably hold a wire-shaped member withdrawn from an outside of the passenger compartment of the door inner panel toward the inside of the passenger compartment through the work aperture and attach the wire-shaped member to the door inner panel,
wherein the attachment member is disposed at a position intersecting with an extension direction of the sealing compound application section,
wherein a sealing compound configured to adhere an outer circumferential edge section of the sealing sheet to an door inner panel side is continuously applied on the sealing compound application section and the attachment member,
wherein the door inner panel comprises a first surface including the sealing compound application section and a second surface recessed toward the outside of the passenger compartment with respect to the first surface,
wherein the attachment member comprises an attachment section attached to the second surface of the door inner panel, and a seal section to which the sealing compound is applied, and
wherein the first surface and the seal section have edge sections adjacent to each other, and
wherein heights of the first surface and the seal section are set to substantially the same height.

2. The vehicular door structure according to claim 1, wherein the first surface and the seal section are flush with each other.

3. The vehicular door structure according to claim 1, wherein the attachment member comprises an insertion section through which the wire-shaped member is inserted between the attachment section and the seal section.

4. The vehicular door structure according to claim 2, wherein the attachment member comprises an insertion section through which the wire-shaped member is inserted between the attachment section and the seal section.

5. The vehicular door structure according to claim 3, wherein an inner diameter of the insertion section is smaller than an outer diameter of the wire-shaped member.

6. The vehicular door structure according to claim 3, wherein the attachment section and the seal section are assembled to be opened and closed.

7. The vehicular door structure according to claim 6, wherein the attachment section comprises a protruding wall protruding toward a seal section side and having a groove that forms the insertion section between the seal section and the attachment section, and
wherein the seal section comprises an engagement section engaged with the protruding wall when the seal section is closed with respect to the attachment section.

8. The vehicular door structure according to claim 7, wherein the seal section comprises a shielding wall protruding in a direction substantially perpendicular to an extension direction of the groove of the protruding wall and configured to cover one side of the attachment section, and
wherein the engagement section is connected to the shielding wall.

9. The vehicular door structure according to claim 8, wherein the groove of the protruding wall is open at the seal section side in a substantially C shape, and
wherein the seal section comprises a rib protruding toward an inside of the groove of the protruding wall.

10. The vehicular door structure according to claim 4, wherein the attachment section and the seal section are assembled to be opened and closed.

11. The vehicular door structure according to claim 5, wherein the attachment section and the seal section are assembled to be opened and closed.

* * * * *